(12) United States Patent
Scott et al.

(10) Patent No.: US 6,292,787 B1
(45) Date of Patent: Sep. 18, 2001

(54) ENHANCING UTILITY AND DIVERSIFYING MODEL RISK IN A PORTFOLIO OPTIMIZATION FRAMEWORK

(75) Inventors: Jason S. Scott, Menlo Park; Christopher L. Jones, Redwood Shores; James W. Shearer, Palo Alto; John G. Watson, Menlo Park, all of CA (US)

(73) Assignee: Financial Engines, Inc., Palo Alto, CA (US)

( * ) Notice: Subject to any disclaimer, the term of this patent is extended or adjusted under 35 U.S.C. 154(b) by 0 days.

(21) Appl. No.: 09/151,715

(22) Filed: Sep. 11, 1998

(51) Int. Cl.$^7$ .................................................. G06F 17/60

(52) U.S. Cl. ........................................................... 705/36

(58) Field of Search ........................ 705/36, 35, 38, 705/30, 37; 707/4, 10

(56) References Cited

U.S. PATENT DOCUMENTS

| | | | |
|---|---|---|---|
| 3,634,669 | 1/1972 | Soumas et al. | 705/4 |
| 3,697,693 | 10/1972 | Deschenes et al. | 705/38 |
| 4,007,355 | 2/1977 | Moreno | 235/379 |

(List continued on next page.)

FOREIGN PATENT DOCUMENTS

| | | | |
|---|---|---|---|
| 0 572 281 A1 | 12/1993 | (EP) | G06F/15/30 |
| WO 91/02326 | 2/1991 | (WO) | G06F/15/21 |
| WO 96/06402 | 2/1996 | (WO) | G06F/17/60 |
| WO 98/13776 | 4/1998 | (WO) | G06F/17/60 |
| WO 98/44444 | 10/1998 | (WO) | G06F/19/00 |
| WO 98/54666 | 12/1998 | (WO) | G06F/17/60 |
| WO 99/05625 | 2/1999 | (WO) | G06F/17/60 |
| WO 99/15985 | 4/1999 | (WO) | G06F/15/30 |
| WO 99/22323 | 5/1999 | (WO) | G06F/17/60 |

OTHER PUBLICATIONS

Science & Technology "A Financial Planner with Nerves of Silicon", Business Week, Oct. 7, 1985, 3 pages.

W.F. Sharpe, "Asset allocation: Management style and performance measurement", The Journal of Portfolio Management, Winter 1992, 14 pages.

Donald R. Woodwell, "Automating Your Financial Portfolio", Second Edition, Dow Jones Irwin, 1983 and 1986.

(List continued on next page.)

*Primary Examiner*—James P. Trammell
*Assistant Examiner*—Thomas A. Dixon
(74) *Attorney, Agent, or Firm*—Blakely, Sokoloff, Taylor & Zafman LLP (57) ABSTRACT

A portfolio optimization process that diversifies model risk by favoring a more diversified portfolio over other portfolios with similar characteristics is provided. According to one aspect of the present invention, a more diverse portfolio may be selected over an initial portfolio in order to diversify model risk with reference to a predetermined diversity budget, defined in terms of expected return, risk, and/or utility. An initial portfolio of financial products is determined from an available set of financial products. One or more dimensions of an error space are searched for an alternate portfolio that is more diverse than the initial portfolio. A cost associated with the alternate portfolio is then calculated by comparing the difference between a characteristic of the initial portfolio and a corresponding characteristic of the alternate portfolio. Finally, the alternate portfolio is selected as the recommended portfolio if the cost is less than or equal to the predetermined diversity budget. According to another aspect of the present invention an intelligent search is performed for a diverse portfolio that meets a predetermined diversity budget. An initial portfolio is determined based upon an available set of financial products. The cost associated with more diversified portfolios compared to the initial portfolio is considered and one of the more diversified portfolios is selected that has an associated cost that is less than or equal to the predetermined diversity budget.

41 Claims, 10 Drawing Sheets

U.S. PATENT DOCUMENTS

| | | | |
|---|---|---|---|
| 4,334,270 | 6/1982 | Towers | 705/36 |
| 4,346,442 | 8/1982 | Musmanno | 705/36 |
| 4,376,978 | 3/1983 | Musmanno | 705/36 |
| 4,597,046 | 6/1986 | Musmanno et al. | 705/36 |
| 4,642,767 | 2/1987 | Lerner | 705/30 |
| 4,648,037 | 3/1987 | Valentino | 364/408 |
| 4,722,055 | 1/1988 | Roberts | 705/36 |
| 4,742,457 | 5/1988 | Leon et al. | 705/35 |
| 4,752,877 | 6/1988 | Roberts et al. | 705/35 |
| 4,774,663 | 9/1988 | Musmanno et al. | 705/36 |
| 4,868,376 | 9/1989 | Lessin et al. | 235/492 |
| 4,876,648 | 10/1989 | Lloyd | 705/38 |
| 4,885,685 | 12/1989 | Wolfberg et al. | 705/14 |
| 4,910,676 | 3/1990 | Alldredge | 364/408 |
| 4,933,842 | 6/1990 | Durbin et al. | 705/30 |
| 4,953,085 | 8/1990 | Atkins | 705/36 |
| 4,989,141 | 1/1991 | Lyons et al. | 705/36 |
| 5,025,138 | 6/1991 | Cuervo | 705/38 |
| 5,101,353 | 3/1992 | Lupien et al. | 705/37 |
| 5,126,936 | 6/1992 | Champion et al. | 705/36 |
| 5,132,899 | 7/1992 | Fox | 705/36 |
| 5,148,365 | 9/1992 | Dembo | 705/36 |
| 5,220,500 | 6/1993 | Baird et al. | 705/36 |
| 5,222,019 | 6/1993 | Yoshino et al. | 705/36 |
| 5,227,967 | 7/1993 | Bailey | 705/35 |
| 5,237,500 | 8/1993 | Perg et al. | 705/35 |
| 5,454,104 | 9/1995 | Steidlmayer et al. | 705/4 |
| 5,471,575 | 11/1995 | Giansante | 707/503 |
| 5,523,942 | 6/1996 | Tyler et al. | 705/4 |
| 5,563,783 | 10/1996 | Stolfo et al. | 705/8 |
| 5,590,037 | 12/1996 | Ryan et al. | 705/4 |
| 5,592,379 | 1/1997 | Finfrock et al. | 705/39 |
| 5,644,727 | 7/1997 | Atkins | 395/240 |
| 5,692,233 | 11/1997 | Garman | 705/36 |
| 5,784,696 | 7/1998 | Melnikoff | 705/36 |
| 5,806,049 | 9/1998 | Petruzzi | 705/36 |
| 5,812,987 | 9/1998 | Luskin et al. | 705/36 |
| 5,819,238 | 10/1998 | Fernholz | 705/36 |
| 5,839,804 | 11/1998 | Ho | 312/223.2 |
| 5,864,827 | 1/1999 | Wilson | 705/35 |
| 5,864,828 | 1/1999 | Atkins | 705/36 |
| 5,875,437 | 2/1999 | Atkins | 705/40 |
| 5,884,283 | 3/1999 | Manos | 705/30 |
| 5,884,285 | 3/1999 | Atkins | 705/36 |
| 5,884,287 | 3/1999 | Edesess | 705/36 |
| 5,911,135 | 6/1999 | Atkins | 705/36 |
| 5,911,136 | 6/1999 | Atkins | 705/36 |
| 5,913,202 | 6/1999 | Motoyama | 705/35 |
| 5,918,217 | 6/1999 | Maggioncalda et al. | 705/36 |
| 5,930,774 | 7/1999 | Chennault | 705/36 |
| 5,930,775 | 7/1999 | McCauley et al. | 705/38 |
| 5,933,815 | 8/1999 | Golden | 705/35 |
| 5,978,778 * | 11/1999 | O'Shaughnessy | 705/36 |
| 5,987,433 | 11/1999 | Crapo | 705/36 |
| 5,987,434 | 11/1999 | Libman | 705/36 |
| 5,991,744 | 11/1999 | DiCresce | 705/36 |
| 6,003,018 | 12/1999 | Michaud et al. | 705/36 |
| 6,012,042 | 1/2000 | Black et al. | 705/36 |
| 6,012,043 | 1/2000 | Albright et al. | 705/36 |
| 6,018,722 | 1/2000 | Ray et al. | 705/36 |
| 6,021,397 * | 2/2000 | Jones et al. | 705/36 |

OTHER PUBLICATIONS

BARRA, Inc. "BARRA Provides Combined Style Analysis and Asset Allocation Capabilities", BARRA Portfolio, 1996, 9 pages.

Henry Fersko–Weiss, "Dialing For Profits", Personal Computing, May, 1986, 3 pages.

"EnCorr", Ibbotson Associates, 1998, 48 pages.

Software Update, "Funds Allocation System", IBM Corporation, 9 pages.

W.F. Sharpe, G.J. Alexander & J.V. Bailey, "Investments", Fifth Edition, Prentice Hall, 1995, 107 pages.

"Net Results", Investment Strategies Network, Inc., 1995, 1996, 1997, 97 pages.

Lichtman, "Software: The Professional Plan", Lotus, Nov., 1986, 4 pages.

IFPS/Optimum, "The Extended Analysis Language for All Users", Execucom Systems Corporation, 1986, 4 pages.

"Asset allocation—one step at a time", Global Investor, Mar., 1997, 8 pages.

International Search Report; PCT/US 98/19920.

International Search Report; PCT/US 98/19951.

International Search Report; PCT/US 98/19952.

International Search Report; PCT/US 98/20709.

Nikolopoulos and Fellrath, "A Hybrid Expert System for Investment Advising", IEEE, 1994, pp. 1818–1820.

Eggenschwiler and Gamma, "ET++SwapsManager: Using Object Technology in the Financial Engineering Domain", OOPSLA, 1992, pp. 166–177.

Jensen and King, "Frontier: A graphical interface for portfolio optimization in a piecewise linear–quadratic risk framework", IBM Systems Journal, vol. 31, No. 1, 1992, pp. 62–70.

Schmerken, "Making Risk Analysis Easy As Alpha, Beta", Wall Street Computer Review, 1988, vol. 5 #4, pp. 8,10,12.

Malliaris and Salchenberger, "Beating the Best: A Neural Network Challenges the Black–Scholes Formula", IEEE, 1993, pp. 445–449.

"1990 Buyer's Guide", Wall Street Computer Review, 1990, 23 pages.

Pantazopoulos et al, "A Knowledge Based System for Evaluation of Option Pricing Algorithms", Computer Science Dept., Purdue University, 1998, pp. 123–140.

Tanaka et al., "Possibility Portfolio Selection", IEEE, 1995, pp. 813–818.

Bellity, "Optimisation Floue Appliquee Au Choix De Portefeuilles", CCF Recherche & Innovation, 1994, 8 pages.

King, "Asymmetric risk measures and tracking models for portfolio optimization under uncertainty", J.C. Baltzer AG, 1993, pp. 165–177.

"InterFace Institutional Software+Data", Ibbotson Associates, Wall Street Computer Review, 1998, 4 pages.

Edessess, Michael et al. "Scenario forecasting: Necessity, not choice." Journal of Portfolio Management, vol. 6 No. 3, pp. 10–15, Sprg 1980.

"Keeping up with technology: the 1991 software update" Trusts & Estates, pp. 34–67, Jun. 1991.

Keyes, Jessica. "Expert Allocator: Tools for portfolio optimization." Pension Management, pp. 44–46, May 1996.

Paroush, Jacob. "Risk and wealth effects on efficient portfolio." Metroeconomics, vol. 26, No. 1–3, pp. 86–96, 1974.

Voros, J. "Portfolio analysis—an analytic derivation of the efficient portfolio frontier." European Journal of Operations Research, vol. 23, No. 3, pp. 294–300, Mar. 1986.

"Software Packages for Investors", Fortune Investors Guide, 6 pages, 1987.

* cited by examiner

ENHANCING UTILITY AND DIVERSIFYING MODEL RISK IN A PORTFOLIO OPTIMIZATION FRAMEWORK

FIELD OF THE INVENTION

The invention relates generally to the field of financial advisory services. More particularly, the invention relates to a portfolio optimization process that diversifies model risk by favoring a more diversified portfolio over other portfolios with similar characteristics.

BACKGROUND OF THE INVENTION

Figure 1:
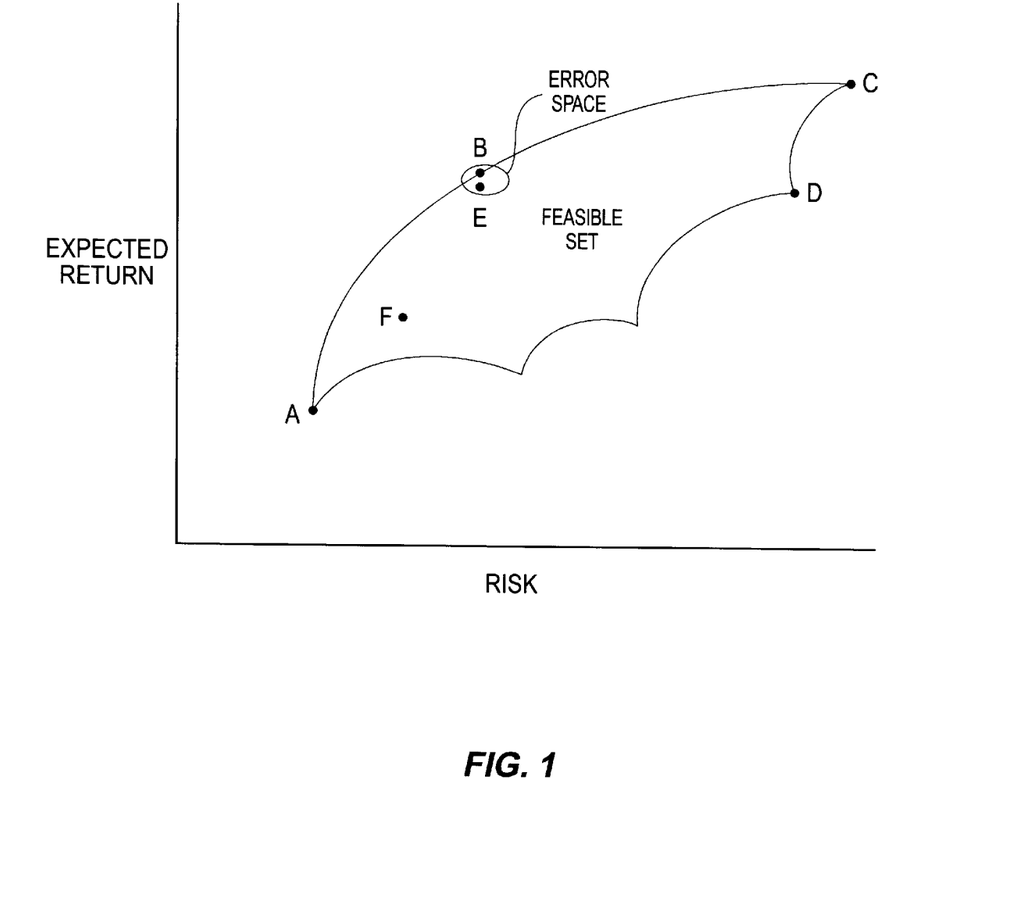
FIG. 1 illustrates a feasible set of portfolios that can be formed from a set of financial products.

From a set of N financial products (N>1), an infinite number of portfolios are available for investment. Existing computer financial analysis systems (also referred to as "portfolio optimizers") purport to help individuals select portfolios to meet their needs. These systems typically implement mathematical models based upon standard optimization techniques involving mean-variance optimization theory. According to the mean-variance approach to portfolio selection, an optimal portfolio of financial products may be identified with reference to an investor's preference for various combinations of risk and return and the set of efficient portfolios (also referred to as the efficient set or the efficient frontier). FIG. 1 illustrates a feasible set of portfolios that represents all the portfolios that maybe formed from a particular set of financial products. The arc AC represents an efficient set of portfolios that each provide the highest expected return for a given level of risk. A portfolio's risk is typically measured by the standard deviation of returns. In general, there are many portfolios that have almost the same expected return and about the same level of risk as any efficient portfolio (e.g., portfolio B and portfolio E). Since statistical estimates of expected returns and risk are used to calculate efficient portfolios, the calculated efficient set could deviate from the true efficient set. When "model risk" is considered, portfolios in an error space surrounding an optimal portfolio are virtually indistinguishable. By "model risk," what is meant is the uncertainty/risk in the mathematical models employed and errors that may be introduced when estimating the properties of the financial products based upon historical data which may contain inaccuracies, such as statistical noise or measurement error, for example. An example of a problem induced by measurement error is the potential for highly concentrated estimated efficient portfolios. For instance, consider an asset that has a large positive error in its expected return estimate. Efficient portfolios constructed ignoring the possibility of this large positive error may yield portfolios with highly concentrated positions in this asset.

Existing portfolio optimizers typically ignore model risk, likely because of the great amount of processing that is thought to be required to identify and select from the many indistinguishable portfolios. Prior art portfolio optimizers are notorious for recommending portfolios that have counterintuitive properties, such as highly concentrated positions in individual assets or asset classes. For example, the typical portfolio optimizer, having ignored portfolio E because it is not in the efficient set, would suggest portfolio B which may include highly concentrated holdings in one of the underlying N assets. Such recommendations make users skeptical of the results of traditional portfolio optimizers and discourage adoption of such investment tools.

One way investment managers have traditionally attempted to compensate for the inadequacies of portfolio optimizers is by imposing constraints or bounds on the optimizer in one or more dimensions. For example, an investment manager may limit exposures to certain asset classes, limit short positions, etc. While these manual constraints can be implemented with knowledge of the bounded universe from which the portfolio will ultimately be built, they have several limitations. First, these manual techniques do not take the cost of imposing constraints on the optimization process into account. Additionally, manual solutions are typically only practical when the universe from which the portfolio can be drawn is limited to one set of mutual funds, asset classes, or financial products.

In view of the foregoing, what is needed is a generalized portfolio diversification approach that produces recommended portfolios that take into account inherent model risk and with which users will be intuitively comfortable, thereby fostering the adoption of optimization tools. Additionally, rather than arbitrarily spreading assets out, it is desirable for the decision to pursue more diversity in a portfolio to consider the cost of such diversity, in terms of its effect on expected return, risk, and/or utility, for example. Finally, it would be advantageous for the diversification approach to be broadly applicable to the universe of financial products.

SUMMARY OF THE INVENTION

A portfolio optimization process that diversifies model risk by favoring a more diversified portfolio over other portfolios with similar characteristics is described. Broadly stated the present invention involves determining an initial portfolio, performing diversification processing to identify one or more alternative portfolios having increased diversification, and selecting a recommended portfolio from the initial portfolio or the one or more alternative portfolios based upon a set of one or more criteria.

According to one aspect of the present invention, a more diverse portfolio may be selected over an initial portfolio in order to diversify model risk with reference to a predetermined diversity budget. An initial portfolio of financial products is determined from an available set of financial products. One or more dimensions of an error space are searched for an alternate portfolio that is more diverse than the initial portfolio. A cost associated with the alternate portfolio is then calculated by comparing the difference between a characteristic of the initial portfolio and a corresponding characteristic of the alternate portfolio. Finally, the alternate portfolio is selected as the recommended portfolio if the cost is less than or equal to the predetermined diversity budget.

According to another aspect of the present invention an intelligent search is performed for a diverse portfolio that meets a predetermined diversity budget. An initial portfolio is determined based upon an available set of financial products. The cost associated with more diversified portfolios compared to the initial portfolio is considered and one of the more diversified portfolios is selected that has an associated cost that is less than or equal to the predetermined diversity budget.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A mechanism is described for diversifying model risk. Such uncertainty/risk is inherent in the mathematical models and the historical data employed by portfolio optimizers, for example. The diversification mechanism described herein may efficiently search an error space proximate to an initially identified optimal portfolio for alternative portfolios that are more diverse than the initial portfolio and that are not too costly to implement in terms of differences in expected returns, risk and/or utility. According to embodiments of the present invention, after an initial efficient portfolio is identified by an optimization process, various characteristics of the initial portfolio may be used as a baseline by a diversification process to measure the cost of implementing more diverse portfolios having very similar expected return, risk, and/or utility characteristics as the initial portfolio. The more diverse portfolios may be located by searching various dimensions of an error space that is proximate to the initial portfolio. For example, the more diverse portfolios may be selected from a group of portfolios that have approximately the same level of risk and slightly lower expected returns than the initial portfolio or from a group of portfolios that have approximately the same expected returns but have a higher level of risk than the initial portfolio. In one embodiment, the diversification process favors more diverse portfolios over other portfolios with similar expected return characteristics by allocating a predetermined cost (referred to as the diversity budget) that can be spent in pursuit of diversity. In this manner, of the portfolios that are evaluated in a predefined error space, the most diverse portfolio that stays within the diversity budget will be selected. In other embodiments, other stopping conditions may also be employed to terminate the diversity processing. For example, the search for a more diverse portfolio than the current portfolio may stop when, among other things: (1) maintaining certain desirable characteristics of the initial portfolio constant is no longer feasible; (2) the number of financial products in the current portfolio exceeds a predetermined number of financial products; and/or (3) a certain number of iterations have been performed and/or a certain number of alternate portfolios have been considered.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be embodied in machine-executable instructions. The instructions can be used to cause a general-purpose or special-purpose processor which is programmed with the instructions to perform the steps of the present invention. Alternatively, the steps of the present invention may be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

While, embodiments of the present invention will be described with reference to a financial advisory system, the method and apparatus described herein are equally applicable to other types of asset allocation applications, financial planning applications, investment advisory services, and financial product selection services, automated financial product screening tools such as electronic personal shopping agents and the like.

SYSTEM OVERVIEW

Figure 2:
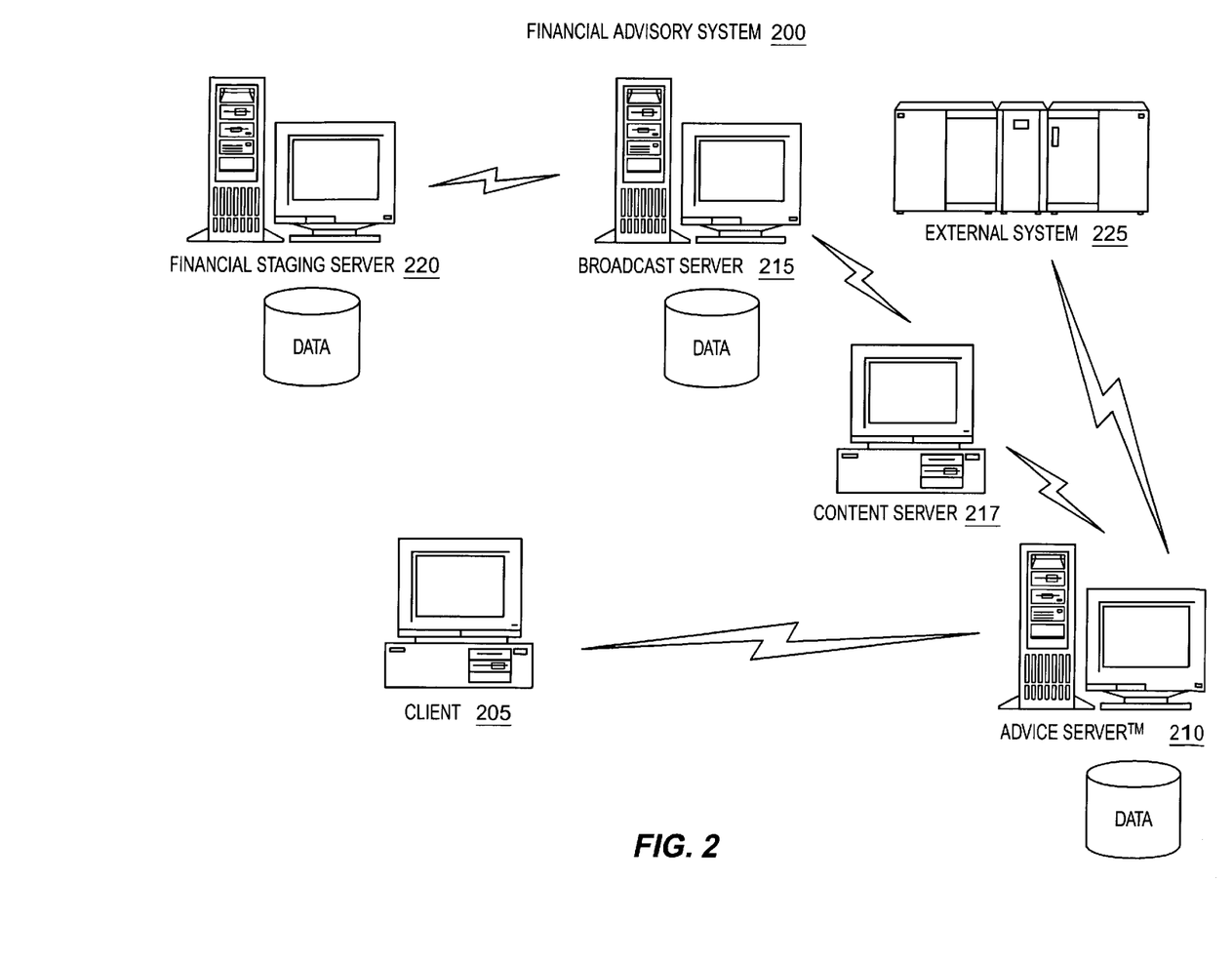
FIG. 2 illustrates a financial advisory system according to one embodiment of the present invention.

The present invention may be included within a client-server based financial advisory system 200 such as that illustrated in FIG. 2. According to the embodiment depicted in FIG. 2, the financial advisory system 200 includes a financial staging server 220, a broadcast server 215, a content server 217, an AdviceServer™ 210 (AdviceServer is a trademark of Financial Engines, Inc., the assignee of the present invention), and a client 205.

The financial staging server 220 may serve as a primary staging and validation area for the publication of financial content. In this manner, the financial staging server 220 acts as a data warehouse. Raw source data, typically time series data, may be refined and processed into analytically useful data on the financial staging server 220. On a monthly basis, or whatever the batch processing interval may be, the financial staging server 220 converts raw time series data obtained from data vendors from the specific vendor's format into a standard format that can be used throughout the financial advisory system 200. Various financial engines may also be run to generate data for validation and quality assurance of the data received from the vendors. Any calibrations of the analytic data needed by the financial engines may be performed prior to publishing the final analytic data to the broadcast server 215.

The broadcast server 215 is a database server. As such, it runs an instance of a Relational Database Management System (RDBMS), such as Microsoft™ SQL-Server, Oracle™ or the like. The broadcast server 215 provides a single point of access to all fund information and analytic data. When advice servers such as AdviceServer 210 need data, they may query information from the broadcast server database. The broadcast server 215 may also populate content servers, such as content server 217, so remote implementations of the AdviceServer 210 need not communicate directly with the broadcast server 215. The AdviceServer 210 is the primary provider of services for the client 205. The AdviceServer 210 also acts as a proxy between external systems, such as external system 225, and the broadcast server 215 or the content server 217.

According to the embodiment depicted, the user may interact with and receive feedback from the financial advisory system 200 using client software which may be running within a browser application or as a standalone desktop application on the user's personal computer 205. The client software communicates with the AdviceServer 210 which acts as a HTTP server.

An Exemplary Computer System

Figure 3:
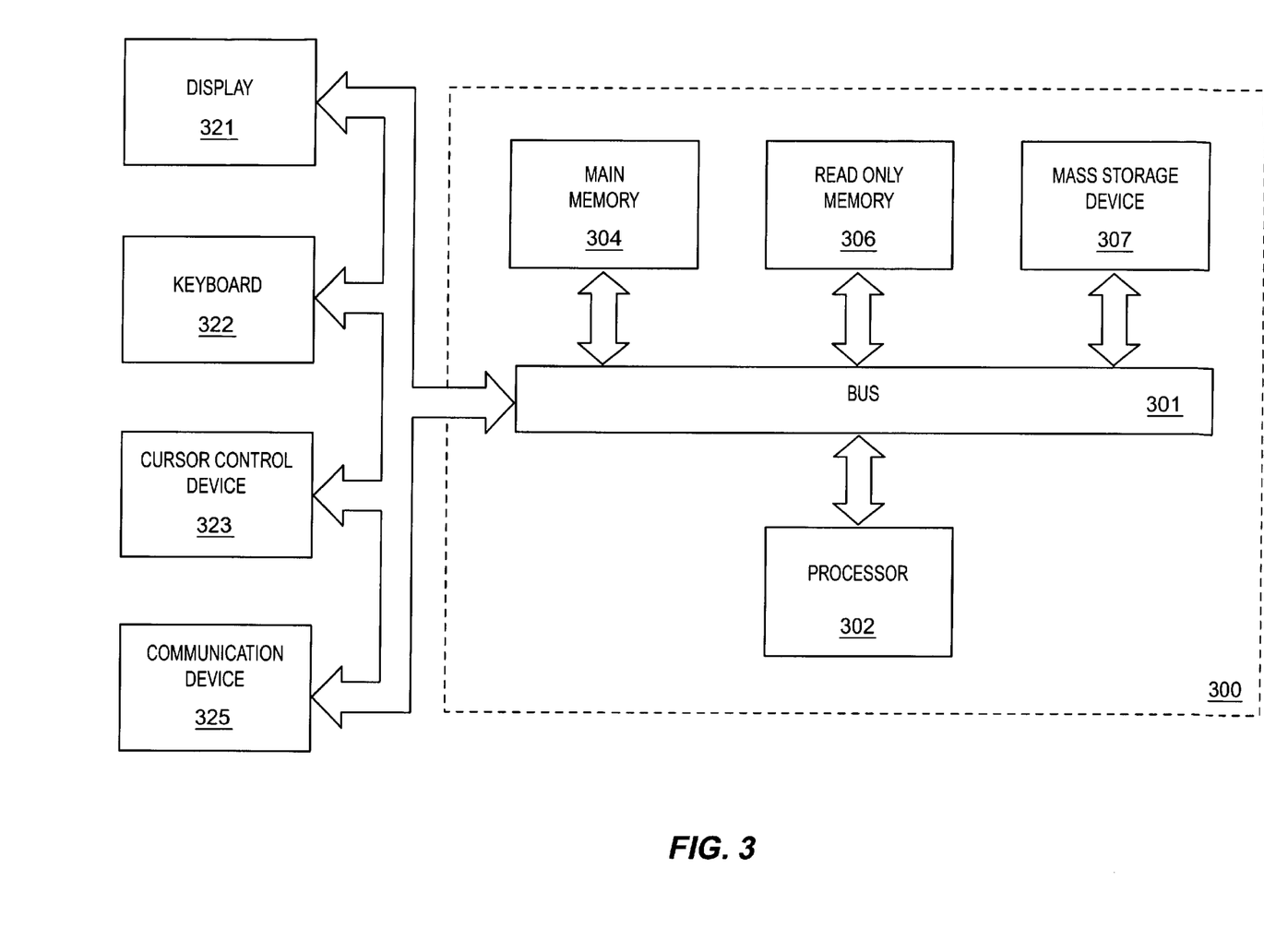
FIG. 3 is an example of a computer system upon which one embodiment of the present invention may be implemented.

Having briefly described an exemplary financial advisory system 200 which may employ various features of the present invention, a computer system 300 representing an exemplary client 105 or server in which features of the present invention may be implemented will now be described with reference to FIG. 3. Computer system 300 comprises a bus or other communication means 301 for communicating information, and a processing means such as processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302.

A data storage device 307 such as a magnetic disk or optical disc and its corresponding drive may also be coupled to computer system 300 for storing information and instructions. Computer system 300 can also be coupled via bus 301 to a display device 321, such as a cathode ray tube (CRT) or Liquid Crystal Display (LCD), for displaying information to a computer user. For example, graphical depictions of expected portfolio performance, asset allocation for an optimal portfolio, charts indicating short- and long-term financial risk, icons indicative of the probability of achieving various financial goals, and other data types may be presented to the user on the display device 321. Typically, an alphanumeric input device 322, including alphanumeric and other keys, is coupled to bus 301 for communicating information and/or command selections to processor 302. Another type of user input device is cursor control 323, such as a mouse, a trackball, or cursor direction keys for communicating direction information and command selections to processor 302 and for controlling cursor movement on display 321.

A communication device 325 is also coupled to bus 301 for accessing remote servers, such as the AdviceServer 210, or other servers via the Internet, for example. The communication device 325 may include a modem, a network interface card, or other well known interface devices, such as those used for coupling to Ethernet, token ring, or other types of networks. In any event, in this manner, the computer system 300 may be coupled to a number of servers via a conventional network infrastructure, such as a company's Intranet and/or the Internet, for example.

Exemplary Financial Analysis System

Figure 4:
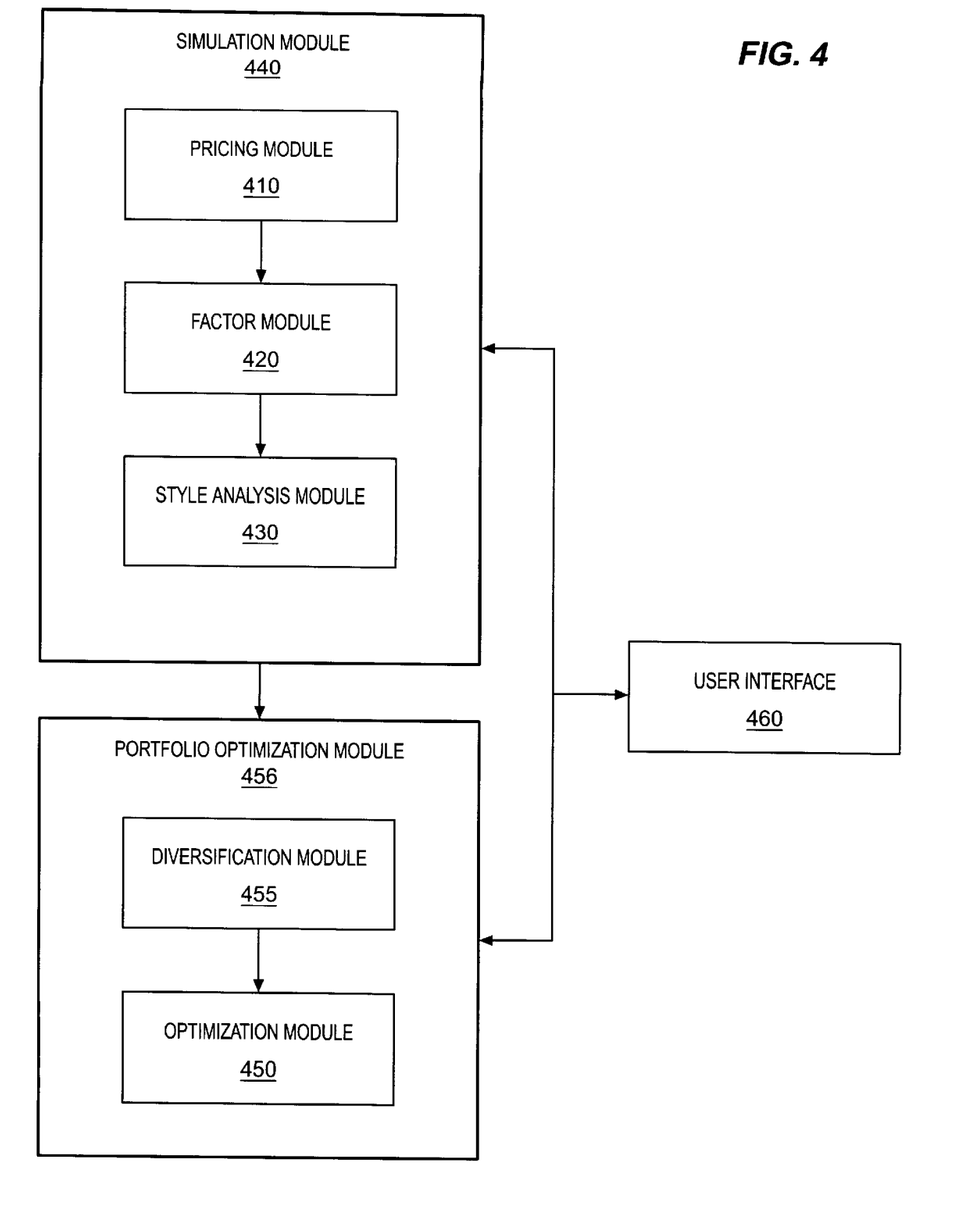
FIG. 4 is a simplified block diagram illustrating one embodiment of a financial analysis system that may employ the diversification mechanism of the present invention.

FIG. 4 is a simplified block diagram illustrating a financial analysis system 400 in which one embodiment of the present invention may be used. Generally, the financial advisory system 400 includes a simulation module 440, a portfolio optimization module 456, and a user interface (UI) 460. The UI 460 may include various mechanisms for data input and output to provide the user with a means of interacting with and receiving feedback from the financial advisory system 400, respectively. Both the simulation module 440 and the portfolio optimization module may receive input data from the user interface (UI) 460 and provide data, such as financial products' exposures to various factors, probability distributions, and recommended portfolios of financial products, to the UI 460.

The simulation module 440 may include a simulation engine for empirically generating draws from a random distribution. According to the embodiment depicted, the simulation module 440 further includes a pricing module 410, a factor module 420, and a style analysis module 430.

The pricing module 410 may generate pricing data for one or more assets. In one embodiment, pricing module 410 generates pricing data for three assets (e.g., short-term bonds, long-term bonds and U.S. equities). These assets are used as core assets by simulation module 440 for simulation functions. Alternatively, the core assets may be different types of assets, such as U.S. equities and bonds (making no distinction between short-term and long-term bonds). Of course, a different number of core assets may also be used.

In one embodiment, pricing module 410 generates a number of asset scenarios. Each scenario is an equally likely outcome based on the inputs to financial advisory system 400. By generating a number of scenarios with pricing module 410, financial advisory system 400 may generate statistics for different projected asset valuations. For example, financial advisory system 400 may provide probability distributions for each projected asset valuation.

Factor module 420 receives core asset pricing data from pricing module 410 and maps the data onto a set of factors. Factors output by factor module 420 are used by returns-based style analysis module 430 to generate style exposures for particular assets. Factor modules and style analysis are well known in the art and are not described in greater detail herein. Factor module 420 and style analysis module 430 may perform the functions as described in "Asset allocation: Management style and performance measurement," by William F. Sharpe, Journal of Portfolio Management, Vol. 18, No.2, which is hereby incorporated by reference.

The portfolio optimization module 456 may determine optimal portfolios based on input provided to financial advisory system 400 via UI 460. In the embodiment depicted, the portfolio optimization module 456 further comprises a diversification module 455 and an optimization module 450. The optimization module 450 calculates the utility maximizing set of financial products under a set of constraints defined by the user and the available feasible investment set. In one embodiment, the calculation is based upon a mean-variance optimization of the financial products.

The diversification module 455 manages diversification processing and evaluates the cost of performing diversification. As will be described further below, during diversification processing, the diversification module 455 may cause the optimization module 450 to perform several iterations of optimization processing with various constraints, such as a maximum exposure to any individual financial product and/or a minimum exposure to any individual financial product. In one embodiment, the diversity budget is set to an appropriate default level. The appropriate default level may be determined by tuning a parameter utilized the financial analysis system until satisfactory results are achieved, for example. In another embodiment, the user may provide a preference for diversification via the UI 460, which may in turn be used to determine the diversity budget. Depending upon the user's expressed preference for diversity, a diversity budget, typically from 0 basis points to 16 basis points may be allocated, for example, corresponding to a preference for no diversity and a high preference for diversity, respectively. Importantly, as will be discussed further below, rather than arbitrarily spreading assets out, the decision to pursue more diversity in a portfolio by the diversification module 455 is made after explicitly considering cost of such diversity, in terms of its effect on expected return, risk, and/or utility, for example.

Importantly, the portfolio optimization module 456 may execute on a server or on the same computer upon which the UI 460 resides.

Further description of a financial advisory system that may incorporate various features of the present invention is disclosed in U.S. Pat. No. 6,021,397, entitled "Financial Advisory System," filed Dec. 2, 1997 that is assigned to the assignee of the present invention and which is hereby incorporated by reference.

Portfolio Optimization

In general, portfolio optimization is the process of determining a set of financial products that maximizes the utility function of a user. According to one embodiment, portfolio optimization processing assumes that users have a mean-variant utility function, namely, that people like having more expected wealth and dislike volatility of wealth. Based on this assumption, given a user's risk tolerance, the portfolio optimization module 456 may calculate an initial mean-variance efficient optimal portfolio from a set of financial products that are available to the user. Depending upon the user's diversity preference, other more diversified portfolios may then be considered for purposes of diversifying model risk. Preferably, both the optimization problem and the diversification problem are expressed as a series of one or more Quadratic Programming (QP) problems. QP is a technique for solving optimization problems involving quadratic (squared terms) objective functions with linear equality and/or inequality constraints. A number of different QP techniques exist, each with different properties. For example, some are better for suited for small problems, while others are better suited for large problems. Some are better for problems with very few constraints and some are better for problems with a large number of constraints. According to one embodiment of the present invention, when QP is called for, an approach referred to as an "active set" method is employed herein. The active set method is explained in Gill, Murray, and Wright, "Practical Optimization," Academic Press, 1981, Chapter 5. Advantageously, if the diversification problem can be structured as a series of one or more QP problems, then interactive applications, such as software that provides financial advice to individuals, may perform diversification processing in real-time.

Figure 5:
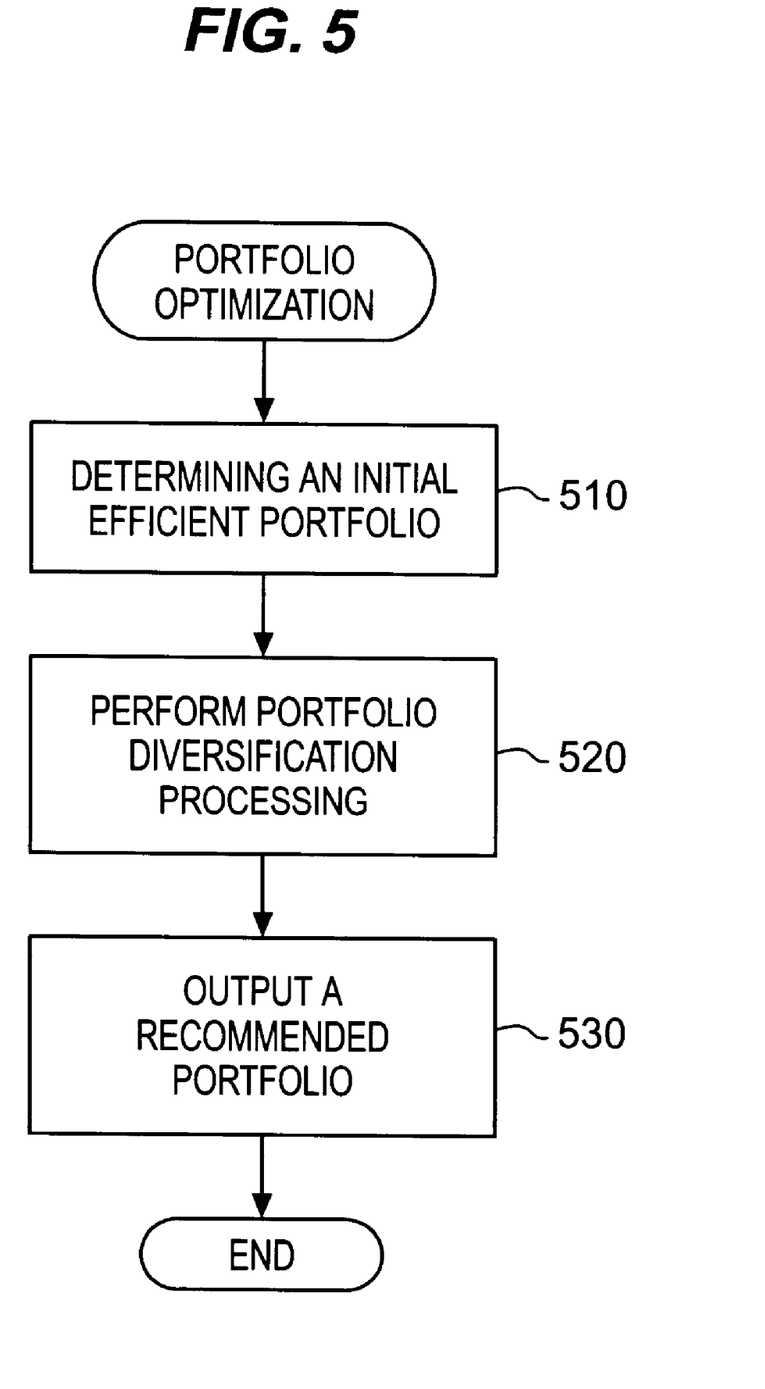
FIG. 5 is a flow diagram illustrating portfolio optimization processing according to one embodiment of the present invention.

Referring now to FIG. 5, portfolio optimization processing according to one embodiment of the present invention will now be described. In one embodiment, the steps described below may be performed under the control of a programmed processor, such as processor 302 resident in client 205, or one of the servers 220, 215, 217, or 210. At step 510, an initial optimal portfolio is determined. According to one embodiment of the present invention, the optimal portfolio is a mean-variance efficient portfolio which may be determined with reference to user-supplied data regarding his/her desirability for various combinations of risk and return. In this example, wealth in real dollars may be optimized by maximizing the following mean-variance utility function by determining portfolio proportions ($X_i$):

$$U = E(W) - \frac{Var(W)}{\tau} \quad (EQ\#1)$$

where for a given scenario,

E(W) is the expected value of wealth

Var(W) is the variance of wealth $\tau$ is the user's risk tolerance $$W = W_0 \sum_{i=1}^{n} X_i(1 + R_i) \quad (EQ\#2)$$

where, $w_0$=initial wealth $R_i$=random return on financial product i $x_i$ represents the recommended constant proportion of each contribution allocated to financial product i.

$0 \leq X_i \leq UB$

UB=Upper bound on maximum exposure n is the number of financial products that are available for optimization.

At step 520, a process for increasing diversification is performed, which is described further below.

At step 530, a recommended portfolio is output.

Diversification Processing

Figure 6:
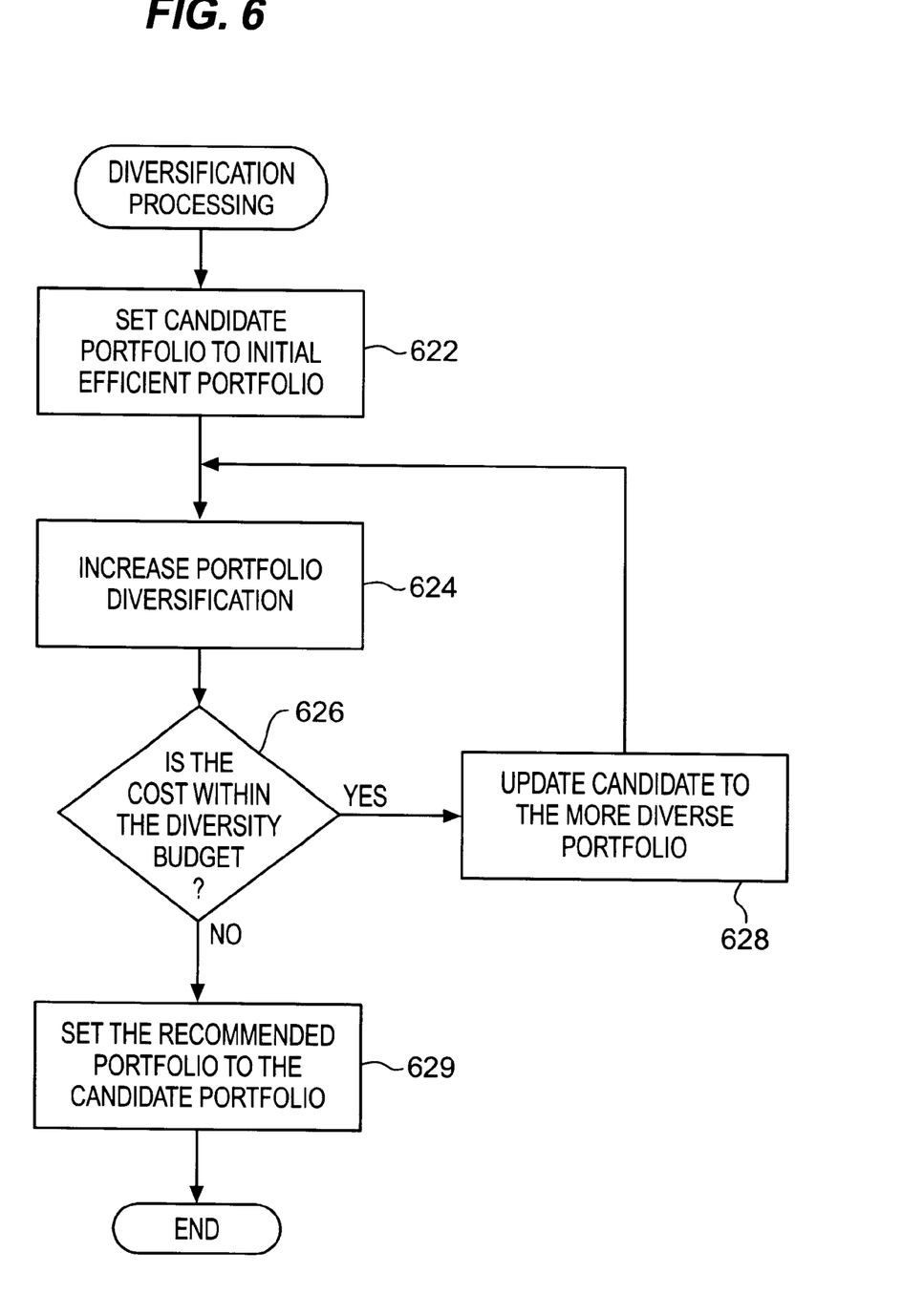
FIG. 6 is a flow diagram illustrating diversification processing according to one embodiment of the present invention.

FIG. 6 is a flow diagram illustrating diversification processing according to one embodiment of the present invention. Conceptually, the diversification processing generally breaks down into an initialization stage, a diversification stage, and an output stage. In the embodiment depicted, the initialization stage is represented by step 622, the diversification stage includes steps 624, 626, and 628, and the output stage is represented by step 629. Briefly, after initializing the candidate portfolio, the diversification stage performs an efficient search of an error space for a more diversified portfolio that can be implemented without exceeding a predetermined diversity budget. The error space is an area proximate to or surrounding the initial candidate portfolio and having boundaries defined in terms of expected return, risk, and/or utility, for example.

At step 622, the candidate portfolio is initialized to the efficient portfolio that was identified in step 510.

At step 624, a portfolio that is more diversified than the current candidate portfolio is generated. Various approaches for intelligently identifying a more diverse portfolio than the candidate portfolio are described below.

At step 626, it is determined whether of not the cost of implementing the more diversified portfolio is within the diversity budget. If so, then processing continues with step 628; otherwise processing continues with step 629.

At step 628, the candidate portfolio is updated with the more diversified portfolio and processing continues with step 624. In this manner, the most diversified portfolio within the cost constraints defined by the diversity budget may be identified.

At step 629, the current candidate portfolio is output as the recommended portfolio.

Figure 7:
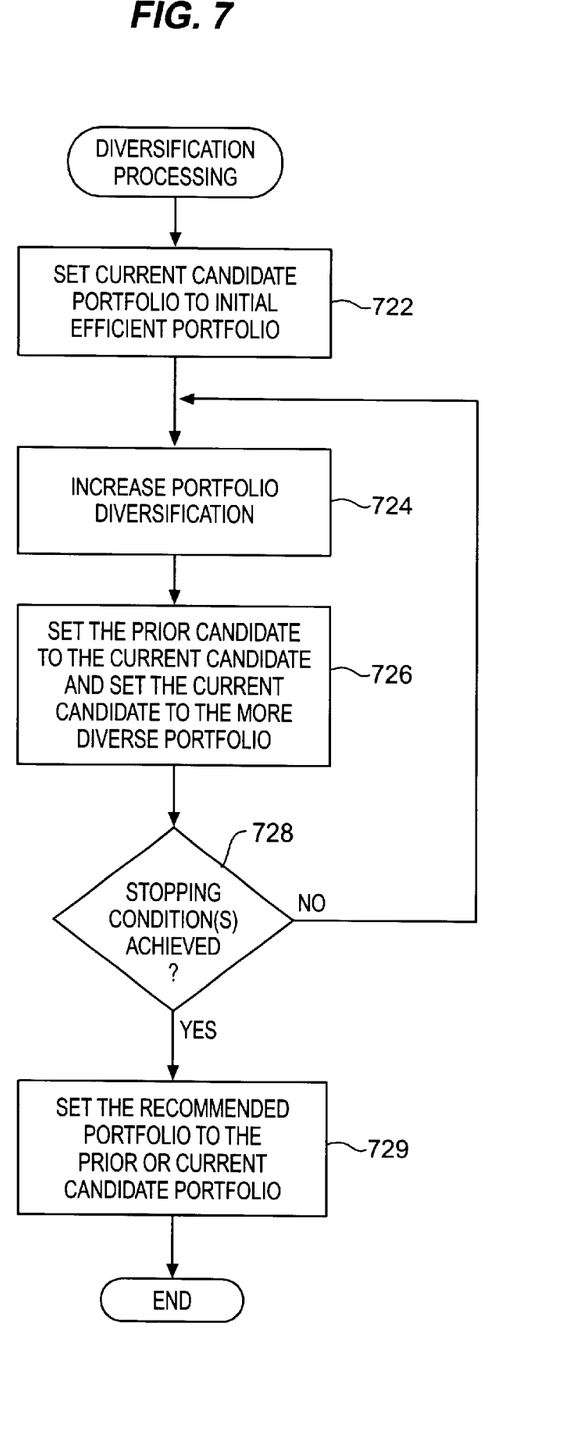
FIG. 7 is a flow diagram illustrating diversification processing according to another embodiment of the present invention.

Ultimately, since there might be an extremely large number of alternative portfolios of financial products to evaluate, one goal of diversification processing (step 520) is to limit the diversification problem in an intelligent manner. Cost was illustrated above as an exemplary boundary that may act as a stopping condition for diversification processing. As will be explained with reference to FIG. 7, various other conditions may be used to terminate the diversification processing. FIG. 7 is a flow diagram illustrating diversification processing according to another embodiment of the present invention.

At step 722, the candidate portfolio is initialized to the efficient portfolio that was identified in step 510.

At step 724, a portfolio that is more diversified than the current candidate portfolio is generated.

At step 726, the prior candidate portfolio is set to the current candidate portfolio and the current candidate portfolio is set to the more diversified portfolio and processing continues with step 728. In this manner, depending upon the stopping condition either the portfolio evaluated by the current or prior iteration may be returned as the recommended portfolio depending upon the stopping conditions.

At step 728, it is determined whether of not one or more stopping conditions has been achieved. If not, then processing continues with step 724; otherwise processing continues with step 729. According to one embodiment, one or more of the following stopping conditions may be used to terminate the diversification processing:

(1) the cost exceeds the diversity budget;
(2) maintaining one or more certain desirable characteristics of the initial candidate portfolio constant is no longer feasible;
(3) the maximum exposure is less than a predetermined minimum exposure threshold;
(4) exposure to a predetermined minimum or maximum number of financial products has been achieved;
(5) a predetermined minimum or maximum number of diversification iterations has been performed; and
(6) a predetermined minimum or maximum number of alternate portfolios has been considered.

At step 729, either the current candidate portfolio or the prior candidate portfolio is output as the recommended portfolio depending upon the stopping conditions. For example, if the diversity budget has been exceeded by the current candidate portfolio, then the recommended portfolio is set to the last candidate that remained within the diversity budget (e.g., the prior candidate portfolio, in this example). However, if a stopping condition other than diversity budget caused the processing to terminate, then the recommended portfolio may be set to the current candidate portfolio. For example, if the condition causing the diversity processing to terminate was the number of iterations, then the recommended portfolio is set to the current portfolio.

Generation of a More Diverse Portfolio

Figure 8:
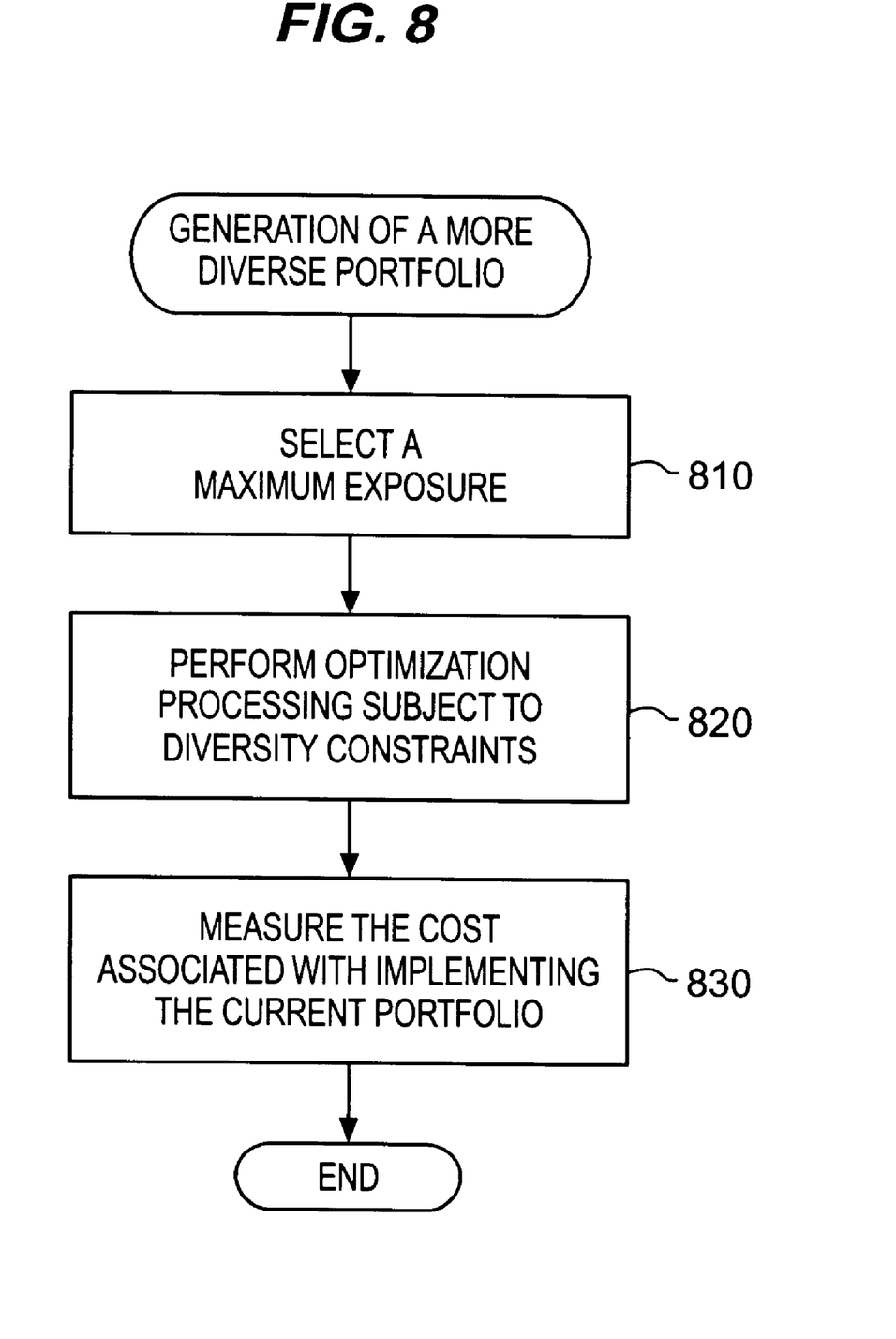
FIG. 8 is a flow diagram illustrating the generation of a more diverse portfolio according to one embodiment of the present invention.

In addition to defining boundaries of the diversification problem in terms of various combinations of stopping conditions, another goal of diversification processing (step 520) is to efficiently search the bounded area (e.g., the error space). FIG. 8 is a flow diagram illustrating the generation of a more diverse portfolio (e.g., steps 624 and 724) according to one embodiment of the present invention. According to the embodiment depicted, diversification is achieved by evaluating additional alternative optimal portfolios, using Equation #1 and #2, for example, under various constraints. At step 810, a maximum exposure is selected. The maximum exposure (e.g., UB from above) defines the maximum percentage of the portfolio's value that may be held in any particular financial product for a particular diversification iteration. Importantly, any of a number of approaches may be employed to select the maximum exposure values for iterations of the diversification processing. In one embodiment, the relationship between cost and maximum exposures is assumed to be monotonic. For example, it may be assumed the cost of implementing an efficient portfolio constrained to a maximum exposure of 80% is greater than the cost of implementing an efficient portfolio constrained to a maximum exposure of 90%. In this manner, a search approach that iteratively lowers the ceiling (as defined by the maximum exposure) to search for a more diverse portfolio may stop once a candidate portfolio exceeds the diversity budget. Similarly, a binary search algorithm may be employed that makes use of the monotonic relationship to select the maximum exposure for the current iteration.

At step 820, optimization processing is performed subject to one or more diversity constraints including the maximum exposure for the current iteration. For example, according to one embodiment, risk is held constant while the maximum exposure constraint is applied. Subsequently, at step 830, one or more characteristics (e.g., expected return, risk, and utility) of the resulting more diversified portfolio are compared to corresponding characteristics of the initially identified optimal portfolio to measure the cost associated with the current level of diversification.

Figure 9A:
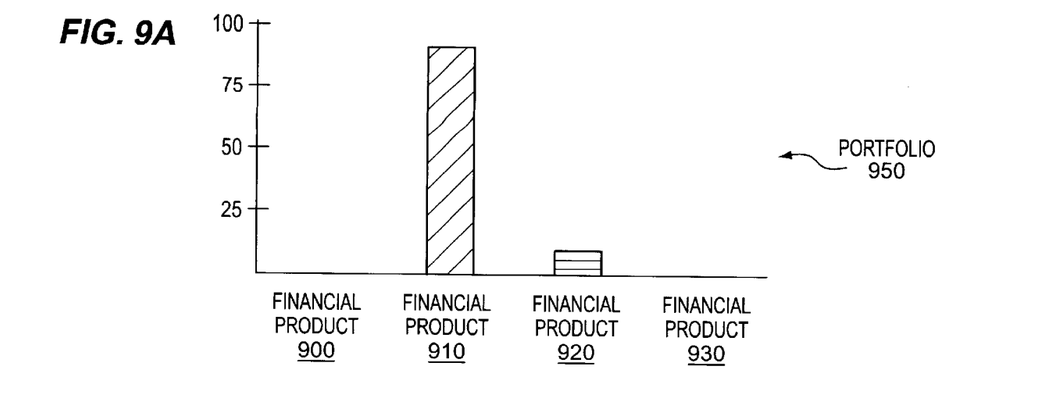
FIG. 9A illustrates an initially identified optimal portfolio.
Figure 9B:
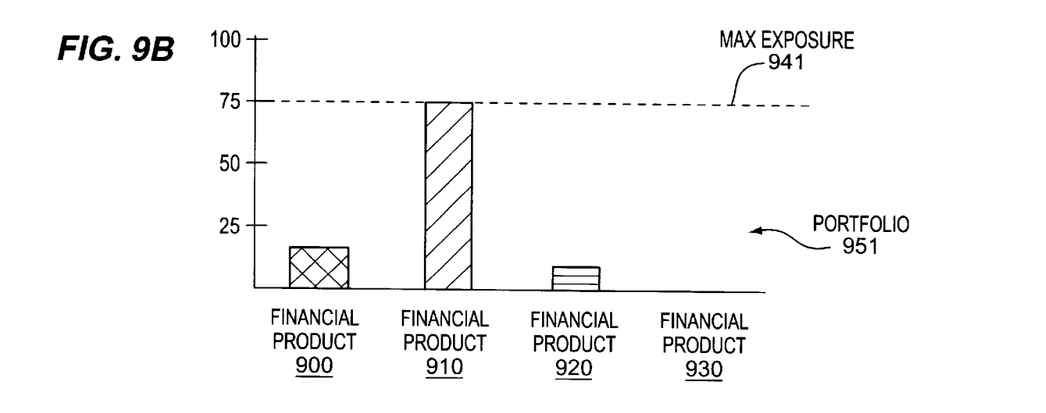
FIG. 9B illustrates the effect of a maximum exposure constraint on the portfolio of FIG. 9A.
Figure 9C:
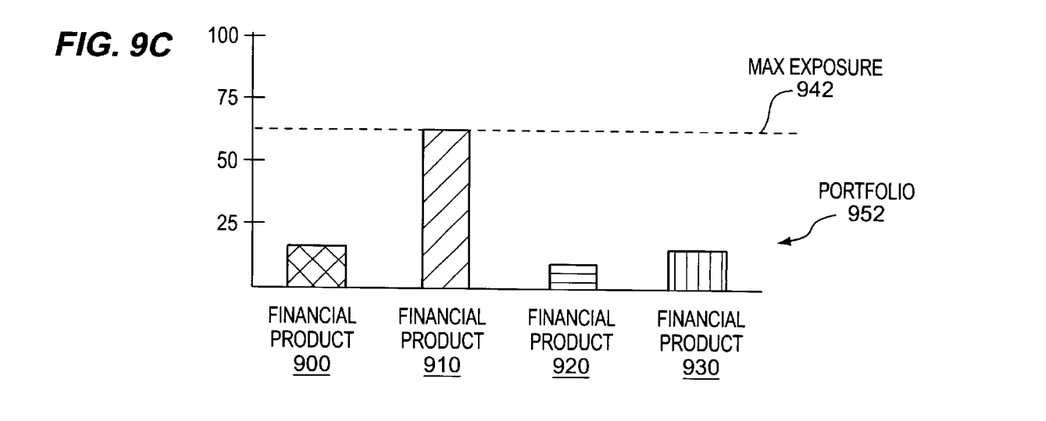
FIG. 9C illustrates a diversified portfolio after one or more stopping conditions have been achieved.

Having described various approaches to diversification processing, exemplary iterations are now illustrated with reference to FIGS. 9A–9C. FIG. 9A illustrates an initially identified optimal portfolio 950. FIG. 9B illustrates the effect of a maximum exposure constraint on the portfolio of FIG. 9A; and FIG. 9C illustrates a diversified portfolio after one or more stopping conditions have been achieved.

In portfolio 950, financial product 910 represents approximately 90% of the portfolio's total value and financial product 920 represents the remaining 10%. According to this example, in a subsequent iteration illustrated by FIG. 9B, a maximum exposure constraint 941 of 75% is imposed upon the optimization process to arrive at a more diverse portfolio 951. The cost of implementing portfolio 951 as opposed to portfolio 950 is determined to be within the allocated diversity budget; therefore, another iteration may be performed. FIG. 9C represents a more diverse portfolio 952 that results from an even more biting maximum exposure constraint 942. However, the cost, in terms of expected return, risk, and/or utility, of implementing portfolio 952 rather than portfolio 950 is greater than the diversity budget. Therefore, in this example, the recommended portfolio would be portfolio 951 (the most diverse candidate portfolio that stayed within the diversity budget).

Figure 10:
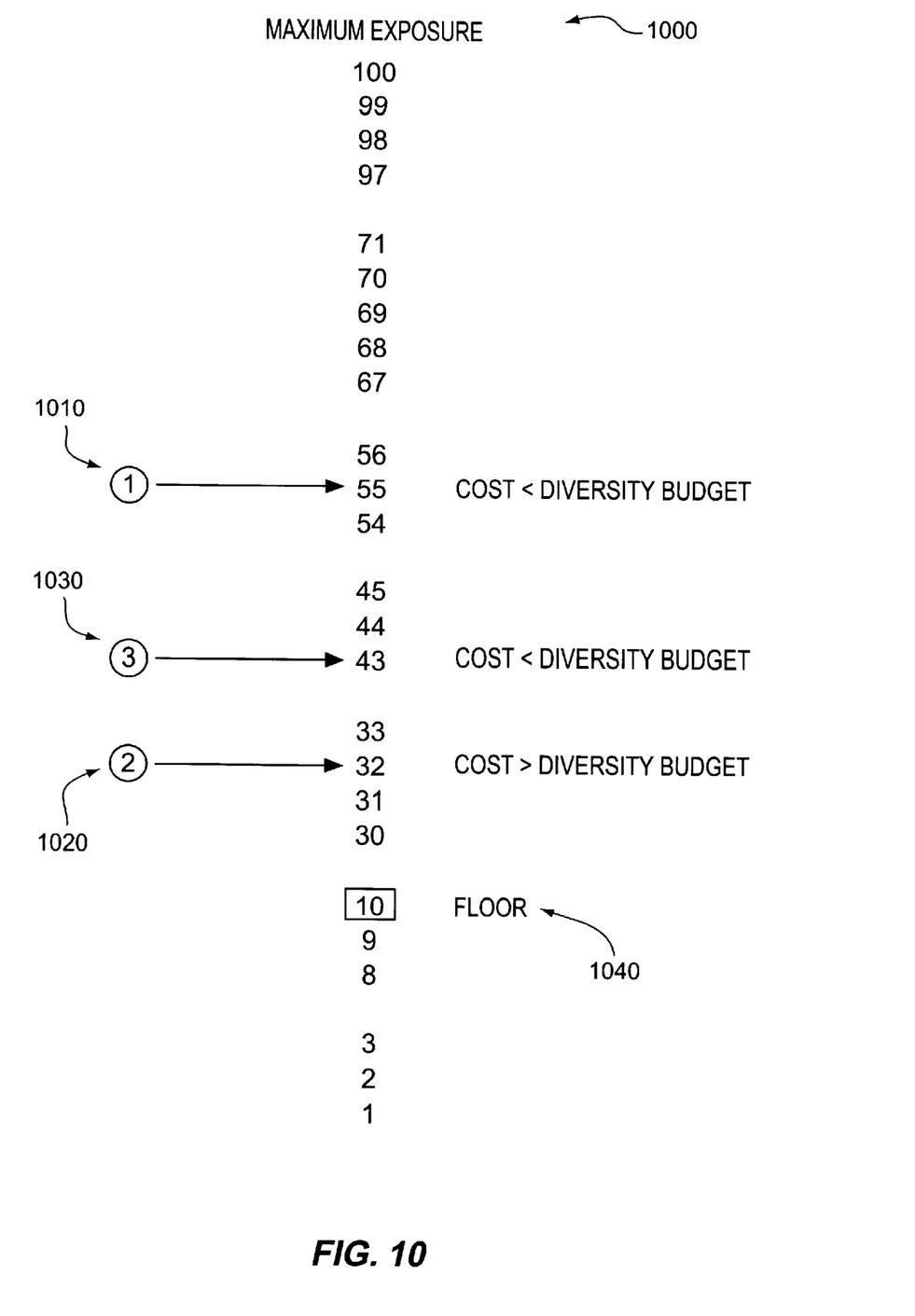
FIG. 10 conceptually illustrates an approach for quickly finding a diversified portfolio that meets the diversity budget according to one embodiment of the present invention.

FIG. 10 conceptually illustrates an approach for quickly finding a diversified portfolio employing a binary search approach according to one embodiment of the present invention. A maximum exposure 1010 for the first iteration is selected. In this example, the maximum exposure 1010 for the first iteration is 55% (approximately half way between 100% and a floor 1040 of 10%). If the diversity budget is exceeded in the first iteration, then in the next iteration the maximum exposure value is selected to be between 100% and 55% where the cost is known to be lower. In the example of FIG. 10, the cost of implementing the candidate portfolio identified by the first iteration is less than the diversity budget; therefore, the maximum exposure value for the second iteration 1020 is selected to be approximately half way between the current exposure and the floor 1040. Subsequent iterations continue in this manner by recursively splitting a remaining portion of the maximum exposure range known to meet the budget constraint until one or more stopping conditions are achieved.

Alternative Embodiments

Many alternative embodiments are contemplated by the inventors of the present invention. In the foregoing, expected return is used as an exemplary measure of the cost of diversification. Importantly, however, it should be understood that the present invention is broadly applicable to portfolio diversification approaches that use other measurements of cost, such as risk and/or utility. For example, the expected return on a portfolio could be held constant, and an efficient search could be performed to find a more diverse portfolio within a certain risk budget. Alternatively, diversity may be increased until a given utility budget is exhausted. The utility budget may be defined based upon a user specific utility function which maps any arbitrary characteristics of the portfolio onto a utility measure of desirability, for example. In other embodiments, the optimization problem can be structured to maximize an arbitrary measure of diversity subject to an arbitrary budget.

Certain aspects of the invention described herein have equal application to various other optimization problems such as those where the inputs into the optimization process are subject to estimation or other types of errors.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of diversifying model risk when selecting a portfolio comprising one or more financial products of an available set of financial products, the method comprising the steps of:

determining an initial portfolio of financial products from an available set of financial products;

determining an alternate portfolio that is more diverse than the initial portfolio by searching one or more dimensions of an error space;

calculating a cost associated with the alternate portfolio by comparing the difference between a characteristic of the initial portfolio and a corresponding characteristic of the alternate portfolio; and selecting the alternate portfolio if the cost is less than or equal to a predetermined diversity budget.

2. The method of claim 1, wherein searching one or more dimensions of an error space comprises evaluating portfolios having substantially the same level of risk as the initial portfolio but having lower expected returns.

3. The method of claim 1, wherein searching one or more dimensions of an error space comprises evaluating portfolios having approximately the same expected returns as the initial portfolio but having a higher level of risk.

4. The method of claim 1, wherein searching one or more dimensions of an error space comprises evaluating portfolios with higher diversity levels, but with utility levels which do not fall below a predetermined utility floor defined by a utility budget.

5. A method of selecting a portfolio comprising one or more financial products of an available set of financial products, the method comprising the steps of:

determining an initial portfolio of financial products from an available set of financial products;

considering the cost associated with a set of more diversified portfolios compared to the initial portfolio; and selecting a portfolio from the set of more diversified portfolios having an associated cost that is less than or equal to a predetermined diversity budget.

6. The method of claim 5, wherein the step of selecting a portfolio from the set of more diversified portfolios having an associated cost that is less than or equal to a predetermined diversity budget comprises selecting the most diverse portfolio of the set of more diversified portfolios having an associated cost that is less than or equal to the predetermined diversity budget.

7. The method of claim 5, wherein the step of considering the cost associated with a set of more diversified portfolios compared to the initial portfolio comprises the steps of:

(a) generating a more diverse portfolio than the initial portfolio; and (b) measuring a cost associated with the more diverse portfolio by comparing a first characteristic of the initial portfolio and a corresponding first characteristic of the more diverse portfolio.

8. The method of claim 7, wherein the step of generating a more diverse portfolio than the initial portfolio comprises the steps of:

setting a maximum exposure for any individual financial product of the available set of financial products to a value that is lower than 100%; and performing a portfolio optimization routine while constraining the holdings in individual financial products of the available set of financial products to the maximum exposure, allowing the first characteristic of the initial portfolio to vary, and holding one or more other characteristics of the initial portfolio constant.

9. The method of claim 8, wherein subsequent more diverse portfolios are iteratively determined by performing the steps of:

modifying the maximum exposure; and performing steps (a) and (b) until one or more stopping conditions are met.

10. The method of claim 9, wherein the stopping conditions include one or more of the following:

the cost exceeds a predetermined diversity budget;

holding the one or more other characteristics of the initial portfolio constant is no longer feasible;

the maximum exposure is less than a predetermined minimum exposure threshold;

exposure to a predetermined maximum number of financial products has been achieved;

a predetermined number of iterations has been performed; and a predetermined number of alternate portfolios has been considered.

11. The method of claim 10, wherein the predetermined diversity budget is a user-specified parameter.

12. The method of claim 8, wherein the step of modifying the maximum exposure comprises lowering the maximum exposure each iteration.

13. The method of claim 8, wherein the step of modifying the maximum exposure comprises the steps of:

selecting a new maximum exposure value according to a binary search algorithm; and setting the maximum exposure to the new maximum exposure value.

14. The method of claim 13, wherein a monotonic relationship is assumed between the cost and the maximum exposure, and wherein the step of selecting a new maximum exposure value is based upon both the binary search algorithm and the monotonic relationship.

15. A method of selecting a portfolio comprising one or more mutual fund products of an available set of mutual fund products, the method comprising the steps of:

determining an initial portfolio and a plurality of more diversified portfolios of mutual fund products from an available set of mutual fund products;

determining a cost associated with each of the plurality of more diversified portfolios; and selecting a portfolio of the plurality of more diversified portfolios if the cost is less than or equal to a predetermined diversity budget.

16. The method of claim 15, wherein the step of selecting a portfolio of the plurality of more diversified portfolios if the cost is less than or equal to a predetermined diversity budget comprises selecting the most diversified portfolio of the more diversified portfolios having an associated cost that is less than or equal to the predetermined diversity budget.

17. The method of claim 16, wherein the step of generating a more diverse portfolio than the initial portfolio comprises the steps of:

setting a maximum exposure for any individual mutual fund product of the available set of mutual fund products to a value that is lower than 100%; and performing a portfolio optimization routine while constraining the holdings in individual mutual fund products of the available set of mutual fund products to the maximum exposure, allowing the expected return to vary, and holding a measure of risk associated with the initial portfolio constant.

18. The method of claim 15, wherein the step of determining a cost associated with each of the plurality of more diversified portfolios comprises the steps of:

(a) generating a more diverse portfolio than the initial portfolio; and (b) measuring a cost associated with the more diverse portfolio by comparing a first expected return associated with the initial portfolio with a second expected return associated with the more diverse portfolio.

19. The method of claim 17, wherein subsequent more diverse portfolios are iteratively determined by performing the steps of:

modifying the maximum exposure; and performing steps (a) and (b) until one or more stopping conditions are met.

20. The method of claim 19, wherein the stopping conditions include one or more of the following:

the cost exceeds a predetermined diversity budget;

holding the measure of risk constant is no longer feasible;

the maximum exposure is less than a predetermined minimum exposure threshold;

exposure to a predetermined maximum number of mutual fund products has been achieved;

a predetermined maximum number of iterations has been performed; and a predetermined maximum number of alternate portfolios has been considered.

21. The method of claim 20, wherein the predetermined diversity budget is a user-specified parameter.

22. The method of claim 19, wherein the step of modifying the maximum exposure comprises lowering the maximum exposure each iteration.

23. The method of claim 19, wherein the step of modifying the maximum exposure comprises the steps of:

selecting a new maximum exposure value according to a binary search algorithm; and setting the maximum exposure to the new maximum exposure value.

24. The method of claim 23, wherein a monotonic relationship is assumed between the cost and the maximum exposure, and wherein the step of selecting a new maximum exposure value is based upon both the binary search algorithm and the monotonic relationship.

25. A method of selecting a portfolio comprising one or more financial products of an available set of financial products, the method comprising the steps of:

determining an initial portfolio of financial products from an available set of financial products;

determining one or more alternate portfolios that are more diverse than the initial portfolio;

measuring a cost associated with achieving diversity by comparing one or more characteristics of the initial portfolio and the one or more alternate portfolios; and selecting a portfolio of the one or more alternate portfolios if the cost is less than or equal to a predetermined diversity budget.

26. The method of claim 25, wherein the cost is defined in terms of expected return, and wherein the step of measuring a cost associated with achieving diversity comprises determining a difference between an expected return associated with the initial portfolio and expected returns associated with the one or more alternate portfolios.

27. The method of claim 26, wherein the predetermined diversity budget is between approximately 0 to 16 basis points, inclusive.

28. The method of claim 25, wherein the cost is defined in terms of risk, and wherein the step of measuring a cost associated with achieving diversity comprises determining a difference between the risk associated with the initial portfolio and risks associated with the one or more alternate portfolios.

29. The method of claim 28, wherein the predetermined diversity budget comprises an annual standard deviation between approximately 0 and 0.01.

30. The method of claim 25, wherein the cost is defined in terms of a utility, and wherein the step of measuring a cost associated with achieving diversity comprises determining a difference between a first utility associated with the initial portfolio and a second utility associated with the one or more alternate portfolios.

31. The method of claim 30, wherein the predetermined diversity budget is dependent upon a predefined utility function.

32. The method of claim 25, wherein the available set of financial products comprises an arbitrary collection of mutual funds or stocks.

33. The method of claim 25, further comprising the step of performing a portfolio optimization routine that constrains the holdings in individual financial products of the available set of financial products to a maximum exposure and constrains risk to a measure of risk associated with the initial portfolio.

34. A method of selecting a recommended portfolio comprising one or more financial products of an available set of financial products, the method comprising the steps of:
determining a first portfolio having a first expected return and associated with a first level of risk, the first portfolio comprising a utility maximizing combination of financial products from a set of available financial products in which the largest holding is limited to X% of the first portfolio;
determining a more diverse portfolio having a second expected return and associated with the first level of risk, the more diverse portfolio comprising a utility maximizing combination of financial products from the set of available financial products in which the largest financial product holding is limited to Y% of the second portfolio, where Y<X;
if the difference between the first expected return and the second expected return is less than a diversity budget, then selecting the more diverse portfolio as the recommended portfolio; otherwise selecting the first portfolio as the recommended portfolio.

35. A method of selecting a portfolio comprising one or more financial products of an available set of financial products, the method comprising the steps of:
determining an initial portfolio and a plurality of more diversified portfolios of financial products from an available set of financial products;
determining a cost associated with each of the plurality of more diversified portfolios; and
selecting the most diversified portfolio of the more diversified portfolios having an associated cost that is less than or equal to a predetermined diversity budget.

36. The method of claim 35, wherein the cost is measured in terms of an expected return, a risk, or a utility.

37. A computer system comprising:
a storage device having stored therein a portfolio optimization routine for simulating portfolio return scenarios for one or more portfolios including combinations of financial products from an available set of financial products;
a processor coupled to the storage device for executing the portfolio optimization routine to select between an initial portfolio and a more diverse portfolio and evaluate a cost associated with implementing the more diverse portfolio rather than the initial portfolio, where:
the initial portfolio is determined with a first maximum exposure constraint;
the more diverse portfolio is determined by imposing a second maximum exposure constraint that limits holdings in any individual financial product of the available set of financial products to a lesser percentage than the first maximum exposure constraint;
the cost reflects the difference between a first expected return associated with the initial portfolio and a second expected return associated with the more diverse portfolio; and
the more diverse portfolio is selected over the initial portfolio if the cost is less than or equal to a predetermined diversity budget.

38. A machine-readable medium having stored thereon data representing sequences of instructions, the sequences of instructions which, when executed by a processor, cause the processor to perform the steps of:
determining an initial portfolio and a plurality of more diversified portfolios of financial products from an available set of financial products;
determining a cost associated with each of the plurality of more diversified portfolios; and
selecting a portfolio of the plurality of more diversified portfolios if the cost is less than or equal to a predetermined diversity budget.

39. The machine-readable medium of claim 38 the sequences of instructions including instructions which, when executed by a processor, further cause the processor to perform the steps of:
selecting a maximum exposure for any individual financial product of the available set of financial products;
generating a more diverse portfolio than the initial portfolio by performing a portfolio optimization routine that constrains the holdings in individual financial products of the available set of financial products to the maximum exposure;
measuring the cost associated with the more diverse portfolio by comparing a characteristic of the initial portfolio and a corresponding characteristic of the more diverse portfolio.

40. A data signal embodied in a propagation medium, the data signal including a plurality of instructions, which when executed by a processor, cause the processor to perform the steps of:
determining an initial portfolio and a plurality of more diversified portfolios of financial products from an available set of financial products;
determining a cost associated with each of the plurality of more diversified portfolios; and
selecting a portfolio of the plurality of more diversified portfolios if the cost is less than or equal to a predetermined diversity budget.

41. The data signal of claim 40 wherein the data signal includes instructions, which when executed by the processor, further cause the processor to perform the steps of:
selecting a maximum exposure for any individual financial product of the available set of financial products;
generating a more diverse portfolio than the initial portfolio by performing a portfolio optimization routine that constrains the holdings in individual financial products of the available set of financial products to the maximum exposure;
measuring the cost associated with the more diverse portfolio by comparing a characteristic of the initial portfolio and a corresponding characteristic of the more diverse portfolio.

* * * * *